(12) United States Patent
Fukagawa et al.

(10) Patent No.: US 7,449,234 B2
(45) Date of Patent: Nov. 11, 2008

(54) SLIDING MATERIAL

(75) Inventors: Toshihiro Fukagawa, Kagawa (JP); Akira Obara, Kagawa (JP); Tetsuya Ogawa, Tochigi (JP); Satoshi Yoshida, Tochigi (JP); Yu Murai, Tochigi (JP); Satoshi Takesako, Tochigi (JP)

(73) Assignees: Mitsubishi Chemical Functional Products, inc., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/443,779

(22) Filed: May 23, 2003

(65) Prior Publication Data
US 2004/0005462 A1    Jan. 8, 2004

(30) Foreign Application Priority Data
May 24, 2002    (JP)    ............... 2002-151461

(51) Int. Cl.
*B32B 5/22*    (2006.01)
*F16D 13/00*    (2006.01)

(52) U.S. Cl. ............ 428/317.9; 428/323; 428/325; 428/408; 428/698; 428/316.6; 192/70.14; 192/107 M; 188/250 R; 188/251 R; 188/251 A

(58) Field of Classification Search .......... 428/317.9, 428/319.1, 312.2, 323, 325, 408, 698, 316.6; 192/70.14, 107 M; 188/250 R, 251 R, 251 A
See application file for complete search history.

(56) References Cited

U.S. PATENT DOCUMENTS

| | | | |
|---|---|---|---|
| 3,712,428 A | 1/1973 | Marin | |
| 3,713,865 A * | 1/1973 | Leeds | 428/367 |
| 4,921,731 A * | 5/1990 | Clark et al. | 427/314 |
| 5,169,718 A * | 12/1992 | Miura et al. | 428/408 |
| 5,398,784 A | 3/1995 | Haneda et al. | |
| 5,525,558 A | 6/1996 | Niwa et al. | |
| 5,566,792 A | 10/1996 | Yamamoto et al. | |
| 5,578,255 A | 11/1996 | Okuyama et al. | |
| 6,255,234 B1 * | 7/2001 | Erdemir et al. | 442/97 |
| 6,514,562 B1 | 2/2003 | Clark et al. | |
| 6,649,265 B1 * | 11/2003 | Kawamura et al. | 428/408 |

FOREIGN PATENT DOCUMENTS

| | | |
|---|---|---|
| DE | 25 01 870 | 9/1975 |
| DE | 36 22 437 | 10/1987 |
| DE | 197 11 829 | 9/1998 |
| DE | 100 48 764 | 4/2002 |
| EP | 0 300 756 | 1/1989 |
| EP | 0 507 564 A2 | 10/1992 |
| FR | 2 626 570 | 8/1989 |
| GB | 1 475 237 | 6/1977 |
| JP | 3-12377 | 1/1991 |
| JP | 3-12378 | 1/1991 |
| JP | 3-197377 | 8/1991 |
| JP | 6-345570 | 12/1994 |
| JP | 7-101783 | 4/1995 |
| JP | 10-194877 | 7/1998 |

OTHER PUBLICATIONS

Translation of JP 10-194877, Sogabe et al, "Tungsten-Carbon Composite Material," Jul. 28, 1998.*
Translation of JP 06-345570, Akihiro Kuroyanagi, "Production of Axidation Resistant C/C Composite Material," Dec. 12, 1994.*

* cited by examiner

*Primary Examiner*—Hai Vo
(74) *Attorney, Agent, or Firm*—Oblon, Spivak, McClelland, Maier & Neustadt, P.C.

(57) ABSTRACT

A sliding material consisting of a carbon-fiber reinforced carbon composite material containing fine particles of a simple substance of any of Group IV to Group VI elements or a carbide, a nitride or an oxide thereof.

5 Claims, No Drawings

SLIDING MATERIAL

BACKGROUND OF THE INVENTION

1. Field of the Invention

The present invention relates to a sliding material consisting of a carbon-fiber reinforced carbon composite material having a high friction coefficient and excellent wear resistance.

2. Description of the Background

A carbon-fiber reinforced carbon composite material (hereinafter referred to simply as C/C composite material) is usually produced by impregnating or mixing a resin to a carbon fiber aggregate, followed by heating forming, or by baking a carbon fiber structure (carbon fiber preform) in a non-oxidizing atmosphere and densifying it, followed by graphitizing treatment as the case requires. The C/C composite material has conventionally been used as a material for e.g. sliding members, drive joints or braking mechanism, as a material which has a high specific strength, which is light and which can be used at a high temperature. It has attracted attention particularly as a sliding material for e.g. a brake and clutch of aircraft, public vehicles and racing vehicles.

When the C/C composite material is used as a sliding material, it is used under heavy load conditions of high temperature and high pressure, and accordingly various methods to increase the friction coefficient and wear resistance have been proposed.

Among them, many methods to cover the surface of the C/C composite material with a SiC layer by means of e.g. a vapor-phase growth method such as a CVD method, a coating method or an impregnation method, have been proposed. However, although the sliding material obtained by this method has improved wear resistance, it tends to have a low friction coefficient. Further, its bulk density tends to be high, thus impairing weight savings, and further, the production costs tend to be high.

On the other hand, it has been known that a sliding material excellent in wear resistance can be obtained by a method of adding fine particles of an inorganic substance having a Knoop hardness of at least 300 $kg/mm^2$ to a carbon fiber preform, followed by forming, baking and densifying (JP-A-7-101783). However, although the sliding material obtained by this method has improved wear resistance, the improvement of the friction coefficient is insufficient.

In a case where the C/C composite material is used as a sliding material for e.g. a brake or clutch, particularly as a brake material or a clutch material for racing vehicles, a sliding material having a high friction coefficient is required for deceleration in a short time or so as to decrease the sliding area. Further, at the time of sliding under a heavy load, the temperature of the sliding material tends to be high, and the friction coefficient tends to decrease by fading, such being problematic. Thus, it is an object of the present invention to provide a sliding material consisting of a C/C composite material which is light and excellent in wear resistance, and which has a high friction coefficient even under a heavy load.

SUMMARY OF THE INVENTION

The present invention has been accomplished as a result of extensive studies to overcome the above problems, and it resides in a sliding material consisting of a carbon-fiber reinforced carbon composite material containing fine particles of a simple substance of any of Group IV to Group VI elements or a carbide, a nitride or an oxide thereof. Group of elements is described in Mendeleev's periodic table.

Now, the present invention will be described in detail with reference to the preferred embodiments.

DETAILED DESCRIPTION OF THE PREFERRED EMBODIMENTS

The sliding material of the present invention consists of a C/C composite material having fine particles of a specific inorganic substance added thereto. The C/C composite material itself is usually produced by a conventionally known method except that specific fine particles are added thereto, and its type is not particularly limited.

Further, as the material carbon fibers, pitch based carbon fibers, polyacrylonitrile based carbon fibers or rayon based carbon fibers may be used. As the preform of carbon fibers, various preforms such as a one-dimensionally oriented preform, a two-dimensionally woven laminated preform such as plain weave, stain weave or woven fabric, a two-dimensional non-woven preform which is two-dimensionally randomly oriented, a three-dimensionally oriented preform, a felt and a tow may be employed. The C/C composite material is produced by densification/heat treatment of such a preform, and as the densifying matrix, a resin, pitch or CVD carbon may, for example, be used, and one type or several types of densifying matrices may be combined.

The resin used as the densifying matrix may, for example, be a phenol resin, a furan resin or an epoxy resin, and a phenol resin having a high carbonization yield is particularly preferred. When pitch or CVD carbon is employed as the densifying matrix, it may be either isotropic or anisotropic. The C/C composite material is produced by applying a heat treatment at a temperature of usually at least 1,000° C., preferably at least 1,300° C., and usually at most 3,000° C., preferably at most 2,400° C., during the densification until the final stage. The bulk density of the C/C composite material is usually from 1.5 to 2.2 $g/cm^3$, preferably from 1.6 to 2.0 $g/cm^3$, and the porosity is usually from 3 to 25 vol %, preferably from 5 to 20 vol %.

The sliding material of the present invention is obtained by incorporating the following fine particles of an inorganic substance into the above C/C composite material by an optional method. The inorganic substance is a simple substance of any of Group IV to Group VI elements or a carbide, a nitride or an oxide thereof. Among them, hafnium, tantalum or tungsten or a carbide, a nitride or an oxide thereof is particularly preferred, and among them, preferred are hafnium, hafnium carbide, hafnium oxide, tungsten, tungsten oxide, tungsten carbide and tantalum, and particularly preferred are hafnium carbide, tungsten and tantalum. The fine particles may be of a combination of several types.

The particle size of the fine particles is usually at least 0.01 μm, preferably at least 0.1 μm, and usually at most 10 μm, preferably at most 5 μm, particularly preferably at most 1 μm. To improve the friction coefficient and to reduce the wear loss of the sliding material, the additive is present preferably in the form of fine particles as far as possible. It is estimated that the additive present on the sliding area grinds the C/C composite material substrate as an abrasive component, and the grinding resistance increases the friction coefficient, however, the degree of grinding of the C/C composite material substrate tends to be significant when the particle size of the additive is large, thus increasing wear. Accordingly, if the particle size is larger than 10 μm, not only the wear tends to be significant, but also addition to the carbon-fiber reinforced carbon composite substrate tends to be nonuniform, and particularly when the fine particles are impregnated to the pores of the carbon-fiber reinforced carbon composite substrate, the fine particles are less likely to enter the pores. On the other hand, if the particle size is smaller than 0.01 µm, not only the effect of reduction of wear tends to be small, but also the cost to pulverize the fine particles tends to be high. The particle size means a number average particle size as measured by a laser method.

The method of incorporating the above fine particles into the C/C composite material is not particularly limited. The fine particles may be supported by a carbon fiber preform or a carbon fiber prepreg, either during the densification step or after completion of the densification. However, to support the fine particles by a preform or a lowly densified product, the fine particles are required to be fixed by e.g. a resin so as to prevent the supported fine particles from dropping, since the number of pores of the C/C composite material is large, and the fine particles easily drop. Further, as the C/C composite material is produced by a heat treatment at a high temperature, the properties of the fine particles may change by the heat treatment depending upon the type of the fine particles. Thus, preferred is a method wherein densification and the heat treatment are completed to obtain the C/C composite material, and then its pores are impregnated with the fine particles.

For example, the following method may be mentioned. The C/C composite material is immersed in a solvent having fine particles of an inorganic substance dispersed therein, the gas present in pores in the inside of the C/C composite material is removed, and the pores in the inside of the C/C composite material are impregnated with the fine particles and the solvent, and then the solvent is removed, followed by drying. Further, a baking treatment may be carried out after the drying as the case requires. The amount of the fine particles dispersed in the solvent may be adjusted depending upon the amount of the pores in the C/C composite material preliminarily measured and the aimed amount of impregnation. An appropriate solvent used for impregnation is one which will not remain in the carbon-fiber reinforced carbon composite substrate after drying, and a solvent having a boiling point of at most 200° C., for example, water, an alcohol such as ethanol or propanol or a glycol may be employed. Further, in order to increase dispersibility of the fine particles, a viscosity improver such as polyethylene oxide may be added to adjust the viscosity of the solvent.

The content of the fine particles is usually at least 0.01 wt %, preferably at least 0.1 wt %, and usually at most 3 wt %, preferably at most 1 wt %, of the total weight of the C/C composite material. If it is less than 0.01 wt %, no adequate effect will be obtained, and if it exceeds 3 wt %, not only friction among the fine particles will take place, thus decreasing the friction coefficient, but also addition and impregnation of the fine particles into the C/C composite material tend to be difficult in some cases.

Further, the fine particles are preferably supported in the vicinity of the surface of the carbon-fiber reinforced carbon composite material, and they are preferably impregnated and supported in the inside with a distance of at least 1 mm, preferably at least 3 mm and at most 10 mm, from the sliding surface. In a case of impregnation with a distance of less than 1 mm, no effect of impregnated fine particles will be obtained when the thickness of the sliding material is reduced to less than 1 mm by wear due to friction. Further, impregnation with a distance exceeding 10 mm is hardly achieved in a case of a C/C composite material having a high degree of densification, and usually a thickness of the part to be used as a friction material of at most 10 mm is sufficient in many cases.

When the sliding material consisting of a specific C/C composite material of the present invention comprises a disk and pads, the fine particles may be contained in either or each of the disk and the pads. When the fine particles are contained in each of the disk and the pads, the type of the fine particles contained in the disk and the pads may be the same or different.

Now, the present invention will be described in further detail with reference to Examples. However, it should be understood that the present invention is by no means restricted to such specific Examples.

EXAMPLE 1

A densifying step of impregnating a three-dimensional preform (bulk density: 0.45 g/cm$^3$) of PAN type carbon fibers with pitch, followed by baking, was repeatedly carried out, followed by a heat treatment at 2,000° C. to obtain a C/C composite material having a porosity of 10 vol % and a bulk density of 1.80 g/cm$^3$ The C/C composite material was formed into a disk brake shape with an outer diameter of 274 φ, immersed in a mixed solution of water and isopropanol (weight ratio of 7:3, density of liquid: 0.94) containing 2.9 wt % of HfC having an average particle size of 0.9 µm and 0.1 wt % of polyethylene oxide, the pressure was reduced to at most 50 Torr and then the pressure was recovered to normal pressure, so that the C/C composite material was impregnated with the HfC particles and the solvent. Then, the solvent was removed by drying. The operation of impregnation and drying was repeated twice to obtain a disk brake having the C/C composite material impregnated with HfC in an amount of 0.3 wt % based on the C/C composite material. This disk brake was cut in half and observed by a stereoscopic microscope, whereupon it was confirmed that the HfC fine particles adequately entered at least up to a portion with a distance of 3 mm from the sliding surface.

On the other hand, a densifying step of impregnating a three-dimension preform of the same PAN type carbon fibers as the disk with pitch, followed by baking, was repeatedly carried out, followed by a heat treatment at 1,600° C. to obtain a pad made of a C/C composite material having a porosity of 13 vol % and a bulk density of 1.70 g/cm$^3$.

The above obtained disk/pads made of the C/C composite material was subjected to a friction test under conditions of an average rotational speed of the sliding area of 30 m/s, a sliding area pressure of 300 PSI, an absorbed energy (disk) per unit area of 750 J/cm$^2$, and as a result, the average friction coefficient was 0.49, the wear rate of the disk was $8.7 \times 10^{-4}$ mm/stop/surf., and the wear rate of the pad was $8.7 \times 10^{-4}$ mm/stop/surf. The above results are shown in Table 1.

COMPARATIVE EXAMPLE 1

A disk and pads made of a C/C composite material were produced in the same method as in Example 1 except that the disk of Example 1 was not impregnated with HfC. The evaluation results of the same friction test as in Example 1 are shown in Table 1.

COMPARATIVE EXAMPLE 2

A C/C composite material disk substrate obtained in the same method as in Example 1 was impregnated with SiC having an average particle size of 1.0 µm in an amount of 0.36 wt % to obtain a disk brake. It was combined with the same pads as in Example 1, and the evaluation results of the same friction test as in Example 1 are shown in Table 1.

COMPARATIVE EXAMPLE 3

A C/C composite material disk substrate obtained in the same method as in Example 1 was impregnated with BN having an average particle size of 1.0 μm in an amount of 0.2 wt % to obtain a disk brake. It was combined with the same pads as in Example 1, and the evaluation results of the same friction test as in Example 1 are shown in Table 1.

TABLE 1

|  | Ex. 1 | Comp. Ex. 1 | Comp. Ex. 2 | Comp. Ex. 3 |
|---|---|---|---|---|
| Type of fine particles | HfC | Nil | SiC | BN |
| Group of fine particles | Group IV | — | Group XIV | Group XIII |
| Average particle size of fine particles (μm) | 0.9 | — | 1.0 | 1.0 |
| Content in disk (wt %) | 0.3 | 0 | 0.36 | 0.2 |
| Content in pad (wt %) | 0 | 0 | 0 | 0 |
| Friction coefficient | 0.49 | 0.44 | 0.40 | 0.43 |
| Wear rate of disk ($\times 10^{-4}$ mm/stop/surf.) | 8.7 | 7.7 | 7.8 | 7.7 |
| Wear rate of pads ($\times 10^{-4}$ mm/stop/surf.) | 8.7 | 11.5 | 7.5 | 11.0 |

EXAMPLE 2

A C/C composite material disk substrate obtained in the same method as in Example 1 was impregnated with W having an average particle size of 0.6 μm in an amount of 0.7 wt %, followed by a heat treatment at 1,600° C. so that W and the C/C composite material substrate were reacted to obtain a disk brake. The obtained C/C composite material disk was cut into half and observed by a SEM-EDX (scanning electron microscope-energy dispersive X-ray analyzer), whereupon W atoms were adequately detected at least up to a portion with a distance of 3 mm from the sliding surface. Further, the C/C composite material disk was analyzed by means of X-ray diffraction, whereupon peaks of WC and $W_2C$ were detected in addition to a peak of carbon. Pads were prepared by repeatedly carrying out a densifying step of impregnating a two-dimensional preform (bulk density: 0.63 g/cm³) of PAN type carbon fibers with pitch, followed by baking, and then carrying out a heat treatment at 2,000° C. to prepare a substrate having a porosity of 16 vol % and a bulk density of 1.65 g/cm³. The pads were not impregnated, and combined with the disk impregnated with W, and the same friction test as in Example 1 was carried out. The evaluation results are shown in Table 2.

COMPARATIVE EXAMPLE 4

A disk and pads made of a C/C composite material were produced in the same method as in Example 2 except that the disk of Example 2 was not impregnated with W. The same friction test as in Example 2 was carried out. The evaluation results are shown in Table 2.

TABLE 2

|  | Example 2 | Comparative Example 4 |
|---|---|---|
| Type of inorganic fine particles | W | Nil |
| Group of inorganic fine particles | Group VI | — |
| Average particle size of fine particles (μm) | 0.6 | — |
| Content in disk (wt %) | 0.7 | 0 |
| Content in pad (wt %) | 0 | 0 |
| Friction coefficient | 0.52 | 0.50 |
| Wear rate of disk ($\times 10^{-4}$ mm/stop/surf.) | 18 | 29 |
| Wear rate of pad ($\times 10^{-4}$ mm/stop/surf.) | 94 | 111 |

EXAMPLE 3

A C/C composite material disk substrate obtained in the same method as in Example 1 was impregnated with Ta having an average particle size of 0.6 μm in an amount of 0.28 wt %, followed by a heat treatment at 1,600° C. so that Ta and the C/C composite material substrate were reacted to obtain a disk brake. The obtained C/C composite material disk was cut into half and observed by a SEM-EDX (scanning electron microscope-energy dispersive X-ray analyzer), whereupon Ta atoms were adequately detected at least up to a portion with a distance of 3 mm from the sliding surface. Further, the C/C composite material disk was analyzed by means of X-ray diffraction, whereupon a peak of TaC was detected in addition to a peak of carbon. As pads, a densifying step of impregnating a two-dimensional preform (bulk density: 0.63 g/cm³) of PAN type carbon fibers with pitch, followed by baking, was repeatedly carried out, followed by a heat treatment at 1,600° C. to prepare a substrate having a porosity of 15 vol % and a bulk density of 1.67 g/cm³. The pads were not impregnated, and combined with the disk impregnated with Ta, and the same friction test as in Example 1 was carried out. The evaluation results are shown in Table 3.

EXAMPLE 4

A C/C composite material disk substrate obtained in the same method as in Example 3 was impregnated with TiN having an average particle size of 1.0 μm in an amount of 0.26 wt % to obtain a disk brake. It was combined with the same pads as in Example 3 and the same friction test as in Example 3 was carried out. The evaluation results are shown in Table 3.

EXAMPLE 5

A C/C composite material disk substrate obtained in the same method as in Example 3 was impregnated with MoC having an average particle size of 1.0 μm in an amount of 0.35 wt % to obtain a disk brake. It was combined with the same pads as in Example 3 and the same friction test as in Example 3 was carried out. The evaluation results are shown in Table 3.

COMPARATIVE EXAMPLE 5

A disk and pads made of a C/C composite material were produced in the same method as in Example 3 except that the disk of Example 3 was not impregnated with Ta. The same friction test as in Example 3 was carried out. The evaluation results are shown in Table 3.

TABLE 3

|  | Ex. 3 | Ex. 4 | Ex. 5 | Comp. Ex. 5 |
|---|---|---|---|---|
| Type of inorganic fine particles | Ta | TiN | MoC | Nil |
| Group of inorganic fine particles | Group V | Group IV | Group VI | — |
| Average particle size of fine particles (μm) | 0.6 | 1.0 | 1.0 | — |
| Content in disk (wt %) | 0.28 | 0.26 | 0.35 | 0 |
| Content in pad (wt %) | 0 | 0 | 0 | 0 |
| Friction coefficient | 0.53 | 0.51 | 0.50 | 0.48 |
| Wear rate of disk ($\times 10^{-4}$ mm/stop/surf.) | 49 | 115 | 183 | 120 |
| Wear rate of pad ($\times 10^{-4}$ mm/stop/surf.) | 29 | 48 | 56 | 50 |

According to the present invention, a sliding material consisting of a carbon-fiber reinforced carbon composite material having a high friction coefficient can be provided without impairing wear resistance.

The entire disclosure of Japanese Patent Application No. 2002-151461 filed on May 24, 2002 including specification, claims and summary is incorporated herein by reference in its entirety.

What is claimed is:

1. A sliding material comprising a combination of a disk substrate and a pad configured to slide against each other, wherein
   the disk substrate comprises a first carbon-fiber reinforced carbon composite material containing fine particles consisting of hafnium carbide having an average particle size of at least 0.01 μm and at most 10 μm, where the content of the fine particles is at least 0.01 wt % and at most 1 wt % of the total weight of the first carbon-fiber reinforced carbon composite material; and
   the pad comprises a second carbon-fiber reinforced carbon composite material that does not contain hafnium carbide particles.

2. The sliding material according to claim 1, wherein the bulk density of the first carbon-fiber reinforced carbon composite material ranges from 1.5 to 2.2 g/cm³.

3. The sliding material according to claim 1, wherein the porosity of the first carbon-fiber reinforced carbon composite material ranges from 3 to 25 vol %.

4. The sliding material according to claim 1, wherein the fine particles are supported in the inside with a distance of at least 1 mm and at most 10 mm from the surface of the first carbon-fiber reinforced carbon composite material.

5. The sliding material according to claim 1, wherein the first carbon-fiber reinforced carbon composite material has a densified matrix which is a pitch, a resin or a CVD carbon.

* * * * *